United States Patent
Mas Rosique et al.

(10) Patent No.: US 11,240,199 B2
(45) Date of Patent: Feb. 1, 2022

(54) SERVICE PROVISION IN SCENARIOS WITH NETWORK ADDRESS TRANSLATION

(71) Applicant: Telefonaktiebolaget LM Ericsson (publ), Stockholm (SE)

(72) Inventors: Maria Luisa Mas Rosique, Madrid (ES); Victor Manuel Avila Gonzalez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 171 days.

(21) Appl. No.: 16/657,620

(22) Filed: Oct. 18, 2019

(65) Prior Publication Data
US 2021/0058366 A1   Feb. 25, 2021

(30) Foreign Application Priority Data
Aug. 20, 2019   (EP) ..................................... 19382718

(51) Int. Cl.
*H04L 29/12*   (2006.01)
*H04L 12/14*   (2006.01)
*H04L 29/08*   (2006.01)

(52) U.S. Cl.
CPC ...... *H04L 61/2557* (2013.01); *H04L 12/1435* (2013.01); *H04L 67/16* (2013.01)

(58) Field of Classification Search
CPC . H04L 61/2557; H04L 12/1435; H04L 67/16; H04L 12/1407; H04M 15/66; H04W 4/24; H04W 92/24; H04W 88/14
See application file for complete search history.

(56) References Cited

U.S. PATENT DOCUMENTS

| 9,948,597 | B1 * | 4/2018 | Bertz | H04L 61/2015 |
| 2007/0156911 | A1 * | 7/2007 | Menten | G06F 21/552 |
| | | | | 709/228 |

(Continued)

FOREIGN PATENT DOCUMENTS

EP   2713583 A1   4/2014

OTHER PUBLICATIONS

"Policy-based QoS architecture in the IP multimedia subsystem of UMTS"; Zhuang et al.; IEEE Network ( vol. 17, Issue: 3, May-Jun. 2003) (Year: 2003).*

(Continued)

*Primary Examiner* — Benjamin H Elliott, IV
(74) *Attorney, Agent, or Firm* — Christopher & Weisberg, P.A.

(57) ABSTRACT

A method for operating a session control entity configured to control a data packet session of a user in a cellular network. A policy request is transmitted to a policy control entity of the cellular network requesting at least one policy rule for the data packet session. A policy response is received including the at least one policy rule for the data packet session and including a request to provide information about an address translation carried out in a user plane on the data packets of the data packet session. Rules for handling the data packet session are transmitted to a user plane entity configured to handle the user plane of the data packet session. The rules include a translation detection rule by which the user plane entity is requested to inform the session control entity about the address translation that has taken place in the user plane.

20 Claims, 13 Drawing Sheets

(56) References Cited

U.S. PATENT DOCUMENTS

| | | | | |
|---|---|---|---|---|
| 2012/0239771 | A1* | 9/2012 | Rasanen | H04L 65/1073 |
| | | | | 709/206 |
| 2014/0269740 | A1* | 9/2014 | Garneij | H04L 61/2507 |
| | | | | 370/401 |
| 2014/0301191 | A1* | 10/2014 | Ludwig | H04W 28/0268 |
| | | | | 370/230 |
| 2014/0325091 | A1* | 10/2014 | Hong | H04L 61/25 |
| | | | | 709/245 |
| 2019/0364115 | A1* | 11/2019 | Asveren | H04L 61/2517 |
| 2020/0128503 | A1* | 4/2020 | Li | H04W 80/10 |
| 2021/0058366 | A1* | 2/2021 | Mas Rosique | H04L 67/16 |

OTHER PUBLICATIONS

International Search Report and Written Opinion dated Apr. 24, 2020 for International Application No. PCT/EP2019/074360 filed on Sep. 12, 2019, consisting of 10-pages.

\* cited by examiner

SERVICE PROVISION IN SCENARIOS WITH NETWORK ADDRESS TRANSLATION

CROSS-REFERENCE TO RELATED APPLICATIONS

This application claims priority to European Patent Application No. 19382718.5 filed on Aug. 20, 2019, the entirety of which is incorporated herein by reference.

TECHNICAL FIELD

The present application relates to a method for operating a session control entity, to a method for operating a policy control entity and for operating a user plane entity.

Furthermore, the corresponding session control entity, policy control entity, and user plane entity are provided. In addition, a system comprising at least two of these entities is provided, a computer program, and a carrier comprising the computer program.

BACKGROUND

FIG. 1 shows a 5G architecture with service based interfaces. The 5G core network part comprises a Network Slice Selection Function, NSSF 10, a Network Exposure Function 15, a Network Repository Function, NRF, 20, a Policy Control Function, PCF, 25, a Unified Data Management, UDM, 30, an Application Function, AF, 35, an Authentication Server Function, AUSF, 40, an Access and Mobility Management Function, AMF, 45, and a Session Management Function, SMF, 50. A User Equipment, UE, 60, is connected to the Radio Access Network, RAN, 70, wherein a user plane function 80 is provided to connect the UE 60 to a data network 90.

Having service based interfaces in the 5G Core Control Plane (CP) implies that the Network Functions, NFs, in the 5G Core CP provide services that are consumed by other NFs in the 5G Core CP.

The roles of these entities and the interfaces have been defined in the 3GPP TS 23.501 and the procedures have been described in TS 23.502.

The most relevant 5G System Architecture network functions for this invention are the following:

PCF 25 supports unified policy framework to govern the network behavior. The PCF provides PCC (Policy and Charging Control) policies to the SMF/UPF which enforces the policies and charging decisions.

SMF 50 is responsible for Session establishment, modification and release, including selection and control of the UPF 80 entities. SMF 50 interacts with the UPF 80 over N4 Reference point using PFCP (Packet Flow Central Protocol) procedures.

UPF 80 handles the user data traffic and optionally includes DPI (Deep Packet Inspection). The UPF Traffic Management and reporting functionality is controlled via N4 by SMF using PFCP procedures and by means of different types of N4 Rules.

NEF 15 is the entry point for ASPs (Application Service Providers) to the Mobile Network Operator Network a.k.a. Connectivity Service Provider (CSP). NEF 15 exposes the Connectivity Service Provider Mobile Network capabilities to the ASPs and translates between information as known by the external Application Functions (AFs) and information as known by the Mobile Network Function/s.

BSF (Binding Support Function, not shown in FIG. 1) is used to find the PCF in charge of the user PDU connection policy session in scenarios with more than one PCF.

In the Packet Core of the 4G System Architecture:

PCRF (Policy and Charging Rules Function) plays the role of the PCF above.

PGW-C (Packed Gateway Control plane) plays the role of the SMF above, at least as long as session management and policy control and enforcement are concerned.

PGW-U (Packed Gateway User plane) plays the role of the UPF above.

SCEF (Service Capability Exposure Function) plays the role of NEF above, at least for the APIs (Application Programming Interfaces) listed above which are supported also in 4G.

DRA (Diameter Routing Agent) plays the role of BSF above. It implements a Diameter Redirect Agent or Diameter Proxy. It ensures that all Diameter sessions for a certain IP-CAN (IP-Connectivity Access Network) session reach the same PCRF. DRA finds the correct PCRF by maintaining PCRF routing information per IP-CAN session or per UE-NAI (Network Access Identifier). Then it matches the user identity (if available), IPv4 address or IPv6 address/prefix (if available) and APN (if available) received in the message with the corresponding information stored the DRA.

In the following, Mobile Core will refer to any, the 5G Core or the Packet Core of the 4G System Architecture.

Furthermore, CP will refer to any SMF or PGW-C, and UP to any, UPF or PGW-U.

UP Control in the Mobile Core

When a user sets a PDN connection (EPC) or an individual PDU session (5GC), the CP selects a UP and establishes a PFCP session. The CP function controls the packet processing in the UP function then by provisioning (i.e. adding, modifying or deleting) Packet Detection Rules (PDRs), FARs, QERs, URRs and/or BAR per PFCP session context.

Each PDR shall contain Packet Detection Information (PDI), i.e. one or more match fields against which incoming packets are matched, and may be associated to the following rules providing the set of instructions to apply to packets matching the PDI.

The PDI includes the following information:

the source interface of the incoming packets;

a combination of the parameters, that incoming packets are requested to match, among: Local F-TEID, Network Instance, UE IP address, SDF Filter(s) and/or Application ID. For 5GC, the PDI may additionally contain one or more QFI(s) to detect traffic pertaining to specific QoS flow(s), Ethernet Packet Filter(s) and/or Ethernet PDU Session Information (see subclause 5.13.1).

Then, each PDR may be associated with one FAR (Forwarding Action Rule), which contains instructions related to the processing of the packets as follows, indicating whether the UP function shall forward the packet (and if so the forwarding policy), duplicate, drop or buffer the packet with or without notifying the CP function about the arrival of a DL packet;

zero, one or more QERs (Quality of Service, QoS, Enforcement Rule), which contains instructions related to the QoS enforcement of the traffic;

zero, one or more URRs (Usage Reporting Rule), which contains instructions related to traffic measurement and reporting.

As shown in FIG. 2, on receipt of a user plane packet, the UP function UPF 80 performs a lookup of the provisioned PDRs and:

identify first the PFCP session to which the packet corresponds; and find the first PDR matching the incoming packet, among all the PDRs provisioned for this PFCP session, starting with the PDRs with the highest precedence and continuing then with PDRs in decreasing order of precedence. Only the highest precedence PDR matching the packet shall be selected, i.e. the UP function shall stop the PDRs lookup once a matching PDR is found.

Network Address Translation

Network address translation (NAT) is a method of remapping one IP address space into another by modifying network address information in the IP header of packets while they are in transit across a traffic routing device. It has become a popular and essential tool in conserving global address space in the face of IPv4 address exhaustion.

The vast bulk of Internet traffic uses Transmission Control Protocol (TCP) or User Datagram Protocol (UDP). For these protocols the port numbers are changed so that the combination of IP address and port information on the returned packet can be unambiguously mapped to the corresponding mobile core network destination. RFC 2663 uses the term network address and port translation (NAPT) for this type of NAT. This is the most common type of NAT and has become synonymous with the term "NAT" in common usage.

Mobile Network Operators, MNOs, have traditionally deployed this functionality in a Service Function (SF) in the Gi-LAN so that packets passing from the Mobile Packet Core Network to the public internet will have their source address modified, while packets passing from the public Internet back will have their destination address modified.

ASP-CSP Collaborative Solutions

CSPs (Connectivity Service Provider) are continuously looking for new sources of revenue based on collaboration with the ASPs. For that, 3GPP has specified in the 4G and 5G Architecture mechanisms to facilitate that collaboration.

Through Exposure Functions (NEF in 5G Core and SCEF in EPC), ASPs can for example request to CSPs:

to become the chargeable party for certain user data flow;
certain QoS for certain user data flow.

User Specific Requests

The NEF/SCEF Northbound interface includes among other APIs to support the above use cases. That interface can be extended in the future with new APIs as new collaborative use cases are identified.

The User identifier is the UE IP Address. ASPs use the Flow Info to identify the target user data traffic by including:

Source IP address and Port of the IP Flow;
Destination IP address and Port of the IP Flow;
Protocol.

Above is also known as the IP flow 5-tuple.

The ASP takes the IP flow 5-tuple and the UE IP address from the user data packets hitting the server side of the service.

The NEF/SCEF 15 contacts the PCF/PCRF 25 handling the user PDU session to convey the ASP request. The PCF/PCRF binds the SCEF/NEF request to the user ongoing PDU session and satisfies the request by installing the corresponding policies in the CP. The CP instructs the UP to enforce the traffic management and reporting actions. This is done by installing in UP rules according to the ASP request.

All the way from the NEF/SCEF down to the UP the IP Flow 5-tuple is kept as the identifier of the ASP request target user data traffic.

No User Specific Requests

The NEF/SCEF northbound interface towards ASPs includes other procedures. As an example, the ASP can provide information for how the traffic of a given application can be identified.

This is the PFD Management API, and among other, the ASP can define the target traffic using the data IP flow 3-tuple, which is not specific for a user. That includes:

Destination IP address and Port of the IP Flow;
Protocol.

In this case, a CSP and ASP service level agreement (SLA) specifies the treatment that the different ASP applications should receive by the CSP. That is controlled and enforced with preconfigured policies and rules.

Mobile Network Operators trust records generated by the Mobile Network (e.g. CDRs) to justify towards the ASP that the services have been provided to ASP users according to the SLAs.

GILAN Consolidation in the Mobile Core Network User Plane

As shown in FIG. 5 the Gi is a 3GPP Reference point between the Mobile Core UP and the External Data Networks for data traffic between a user 5 and the internet 91. The Gi-LAN is the operator LAN on the Gi where operators place Service Functions (SFs) like proxies, traffic accelerators, NAT or firewalls as examples.

There is a general trend to consolidate GI-LAN Functionality in the Mobile Core UP and use UP internal service chaining steering. UP can then steer different user data flows through different GI-LAN SFs on a need basis and control that a user data flow in the uplink (from mobile to network) and in the downlink (from network to mobile) traverse the same SFs (a must for many SFs). UP Internal service chaining allows:

A more efficient usage of the GI-LAN SFs, as they only receive the traffic they need to process (no resource waste).

Smarter and more advanced functionality, as packets return to UP after SF and before leaving UP definitely, and decisions can then be taken along the way.

There are issues with CSP-ASP collaborative solutions previously described when there is a NAT function in the Gi-LAN.

In that scenario, when user enjoys the ASP service, the source IP address and port that the ASP server side can extract from the user data packets are not the same as the source IP address and port of the user data packets assigned to the UE by the Mobile Core.

Consequences are:

When collaboration is based on the mentioned user specific request APIs, the user and the target user data traffic include the User IP address. Unless the user IP address/port before NAT (i.e. the user IP address assigned at user data session establishment) is also in the user data flow in the application layer, the ASP request includes as source IP address and port the ones that the ASP sees, that is, the packet source IP address and port after NAT. In this case, the binding of the ASP Request-User IP Session fails (there is a User IP address mismatch) and the Mobile Core rejects the ASP request.

When the PFD Mgt API is used, and the Mobile Core generates charging data records (CDRs) to be used with ASPs, these CDRs cannot be correlated with any records on the ASP server side. There is a User IP address mismatch, and so there is no common identity that can be used for the information binding.

SUMMARY

Accordingly, a need exists to overcome the above-mentioned problems and to avoid errors occurring in the handling of user data packet sessions in which a network address translation is carried out in the user plane.

This need is met by the features of the independent claims. Further aspects are described in the dependent claims.

According to a first aspect, a method for operating a session control entity is provided, wherein the session control entity is configured to control a data packet session of a user in a cellular network. The session control entity transmits a policy request to a policy control entity of the cellular network, requesting at least one policy rule for the data packet session. Furthermore, a policy response is received from the policy control entity including at least one policy rule for the data packet session, wherein the policy response further comprises a request to provide information about an address translation carried out in a user plane on the data packets of the data packet session. Furthermore, the rules for handling the data packet session are transmitted to a user plane entity configured to handle the user plane of the data packet session, wherein the rules comprise a translation detection rule by which the user plane entity is requested to inform the session control entity about the address translation that has taken place in the user plane.

During the setup of a data packet session the session control entity receives the request to provide the information about the address translation occurring in the user plane. By transmitting a rule to the user plane entity by which the user plane entity is requested to inform a session control entity about the network address translation, the session control entity is made aware of the network address translation occurring in the user plane. Accordingly, the session control entity can receive a report from the user plane entity about the network address translation.

Furthermore, the corresponding session control entity is provided, wherein the session control entity comprises a memory and at least one processing unit, wherein the memory contains instructions executable by the at least one processing unit, wherein the session control entity is operative to work as discussed above or as discussed in further detail below.

As an alternative, the session control entity can comprise a first module configured to transmit the policy request to the policy control entity by which the policy rule for the data packet session is requested. The session control entity can comprise a second module configured to receive the policy response including the request to provide information about the address translation carried out in the user plane. A third module of the session control entity can then transmit the rules for handling the data packet session to the user plane entity, wherein the rules additionally contain the translation detection rule requesting the user plane entity to inform the session control entity about the occurring address translation.

Furthermore, a method for operating a policy control entity is provided, wherein the policy control entity is configured to control the policy rules for the data packet session of the user in the cellular network. The policy control entity receives a policy request from the session control entity requesting at least one policy rule for the data packet session. The policy control entity then determines the at least one policy rule for the data packet session, wherein this step comprises the step of determining that the policy control entity should be informed about an address translation carried out in a user plane on the data packets of the data packet session. Accordingly, a policy response is transmitted to the session control entity, wherein the policy response comprises the at least one policy rule which comprises a request to provide information about an address translation carried out in the user plane on the data packets of the data packet session.

The policy control entity determining the policy rules initiates the procedure by informing the session control entity that information about the address translation should be provided.

Furthermore, the corresponding policy control entity is provided comprising at least one processing unit and a memory, wherein the memory contains instructions executable by the at least one processing unit. The policy control entity is operative to work as discussed above or as discussed in further detail below.

As an alternative, a policy control entity is provided configured to control the policy rules, wherein the policy control entity comprises a first module configured to receive the policy request from the session control entity requesting the policy rule or policy rules for the data packet session. The policy control entity comprises a second module configured to determine the at least one policy rule for the data packet session and configured to determine that information should be provided about an address translation carried out in a user plane of the data packet session. A third module is provided configured to transmit a policy response to the session control entity, the policy response including the at least one policy rule with the request to provide information about the address translation.

Furthermore, a method for operating a user plane entity is provided, wherein the user plane entity is configured to handle the user plane of the data packet session of a user in a cellular network. The user plane entity receives rules for handling the data packet session from a session control entity, wherein the rules comprise a translation detection rule by which the user plane entity is requested to inform the session control entity about the address translation that has taken place in the user plane. The user plane entity stores the received rule with the translation detection rule and receives data packets of a new data packet session. The user plane entity then determines that the received rules apply to the new data packet session and that an address translation has to be carried out in the data packets of the new data packet session. The user plane entity then translates at least one network address in the data packets of the new data packet session, wherein a first network address is replaced by a second network address different from the first network address. The user plane entity furthermore transmits a session report to the session control entity, this session report comprising the binding information with the first network address of the data packets before the address translation and the second network address after the address translation.

Furthermore, the corresponding user plane entity is provided comprising a memory and at least one processing unit, wherein the memory contains instructions executable by the at least one processing unit. The user plane entity is operative to work as discussed above or as discussed in further detail below.

As an alternative, a user plane entity is provided comprising a first module configured to receive the rules for handling the data packet session from the session control entity, wherein the rules comprise the translation detection rule requesting the user plane entity to inform the session control entity about the address translation that occurred in the user plane. A second module of the user plane entity is configured to store the received rules with the translation detection rule and a third module is configured to receive data packets of a new data packet session. A fourth module is configured to determine that the received rules apply to the new data packet session including an address translation. A fifth module is configured to translate the at least one network address based on the rule in which the first network address is replaced by the second network address and a sixth module is configured to transmit a session report to the session control entity including the binding information with the network addresses before and after translation.

Accordingly, the user plane entity carrying out the network address translation informs the session control entity of the network address translation and especially provides the binding information by which the session control entity is informed about the network addresses before and after the translation.

Additionally, a system is provided comprising at least two of the three entities of a group of entities comprising the session control entity, the policy control entity and the user plane entity.

In addition, a computer program comprising program code is provided, wherein execution of the program code causes the at least one processing unit of the session control entity, policy control entity or user plane entity to execute a method as discussed above or as explained in further detail below.

A carrier comprising the computer program is provided, wherein the carrier is one of an electronic signal, optical signal, radio signal, or a computer-readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments, unless explicitly mentioned otherwise.

BRIEF DESCRIPTION OF THE DRAWINGS

The foregoing and additional features and effects of the application will become apparent to one with skill in the art upon examination of the following detailed description and figures. In the figures like reference numerals refer to like elements.

DETAILED DESCRIPTION

Figure 1:
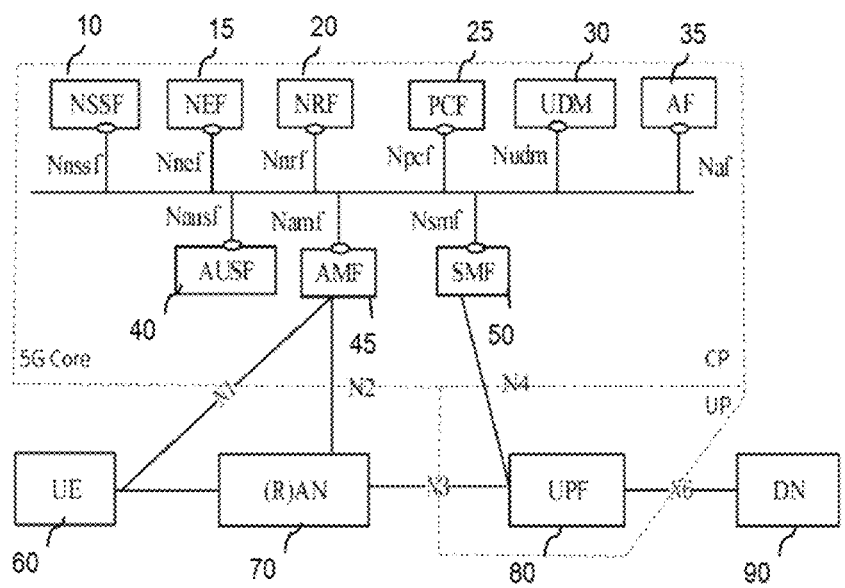
FIG. 1 shows an example schematic architectural view of a known 5G cellular network.
Figure 2:
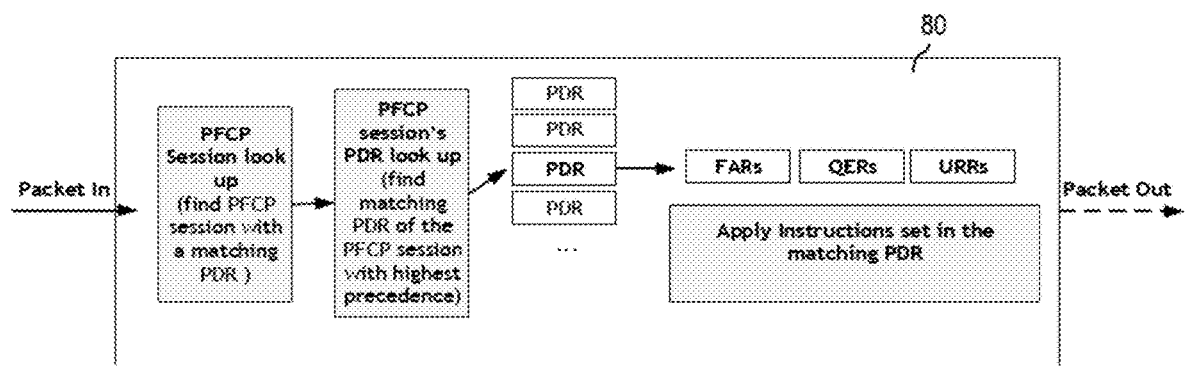
FIG. 2 shows an example schematic view of a known packet handling in a user plane entity, especially with the question which packet detection rules should apply to the received packets.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Within the context of the present application, the term "mobile entity" or "user equipment", UE, refers to a device for instance used by a person, the user, for his or her personal communication. It can be a telephone type of device, for example a telephone or a Session Initiation Protocol, SIP, or voice over IP phone, a cellular telephone, a mobile station, cordless phone, or a personal digital assistant type of device like laptop, notebook, notepad or tablet equipped with a wireless data connection. The UE may also be associated with nonhumans like animals, plants or machines. A UE may be equipped with a Subscriber Identity Module, SIM, or equipped with any unique identities such as the International Mobile Subscriber Identity, MSI, the Temporary Mobile Subscriber Identity, TMSI, or the Globally Unique Temporary UE Identity, GUTI, associated with the user using the UE. The presence of a SIM within a UE customizes the UE uniquely with a subscription of the user.

For the sake of clarity, there is a difference, but also a tight connection between a user and a subscriber. The user gets access to the network by acquiring a subscription to the network and by that becomes a subscriber within the network. The network then recognizes the subscriber, by way of example using the IMSI, TMSI or the GUTI or the like and uses the associated subscription to identify related subscription data. The user can be the actual user of the UE, and the user may also be the one owing the subscription, but the user and the owner of the subscription may also be different.

As will be discussed below, the present application proposes a solution with a mechanism to bind requests from the application service provider to the user data session. Furthermore, mechanisms are provided to have the binding information comprising the new and old network address after and before translation in the records produced according to the service level agreements with the application service provider.

The network address translation function may be included as a service function invoked in the internal service chaining of the user plane entity handling the data packet session. The session control entity can request reporting of events to the user plane entity by including the corresponding Usage Reporting Rule, URR, in the packet detection rules.

As will be explained in further detail below, the session control entity can install a User Reporting Rule, URR, to get a report in the case of a network address translation. This can be done if the user traffic flows will be steered through the network address translation when the binding information binding the network address before and after translation is needed in the core network. The session control entity structures the packet detection rules to consider the policy, charging and also the traffic differentiation needs for a network address translation. The binding information can comprise the user source IP address and port before the translation and the user source IP and port after the network address translation. The user plane entity can then enforce the usage reporting rule after the address translation for usage reporting rules intended to obtain the address translation session binding information for the traffic matching the packet detection rule.

Figure 3:
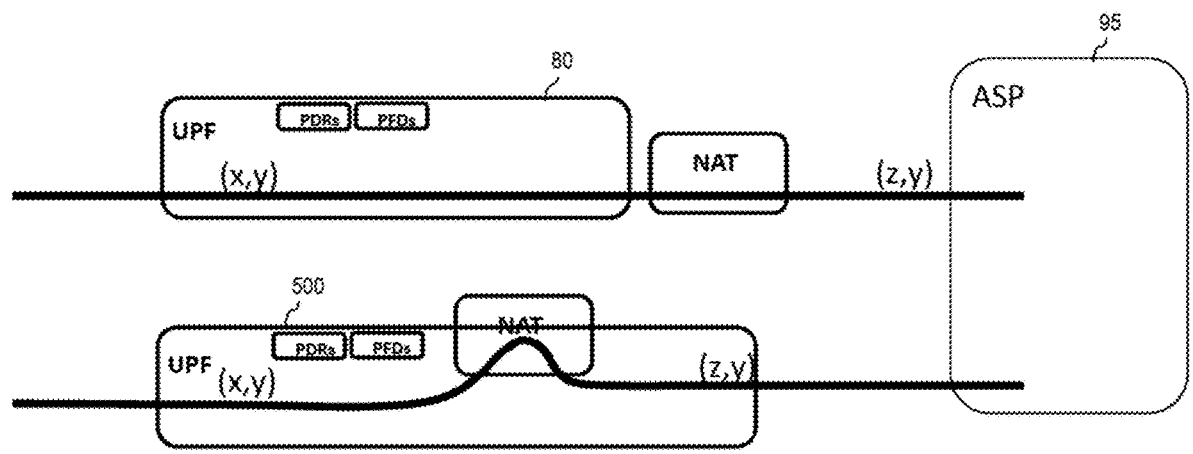
FIG. 3 shows an example schematic view of two options for carrying out an address translation in a user plane.

FIG. 3 shows an example schematic view with a user plane in which a network address translation is carried out outside the user plane function, by way of example in the Gi-LAN, as shown in FIG. 3 wherein in the example below the network address translation is carried out as part of the user plane function. In both cases the source IP address and port before the translation is x, wherein after the address translation the source IP address and port is indicated as being z.

As can be seen, the application service provider 95 in both cases sees the network address after the translation as source address.

The presently claimed invention now solves the problem for the network address translation as shown in the lower example when it is carried out in the user plane function.

Figure 4:
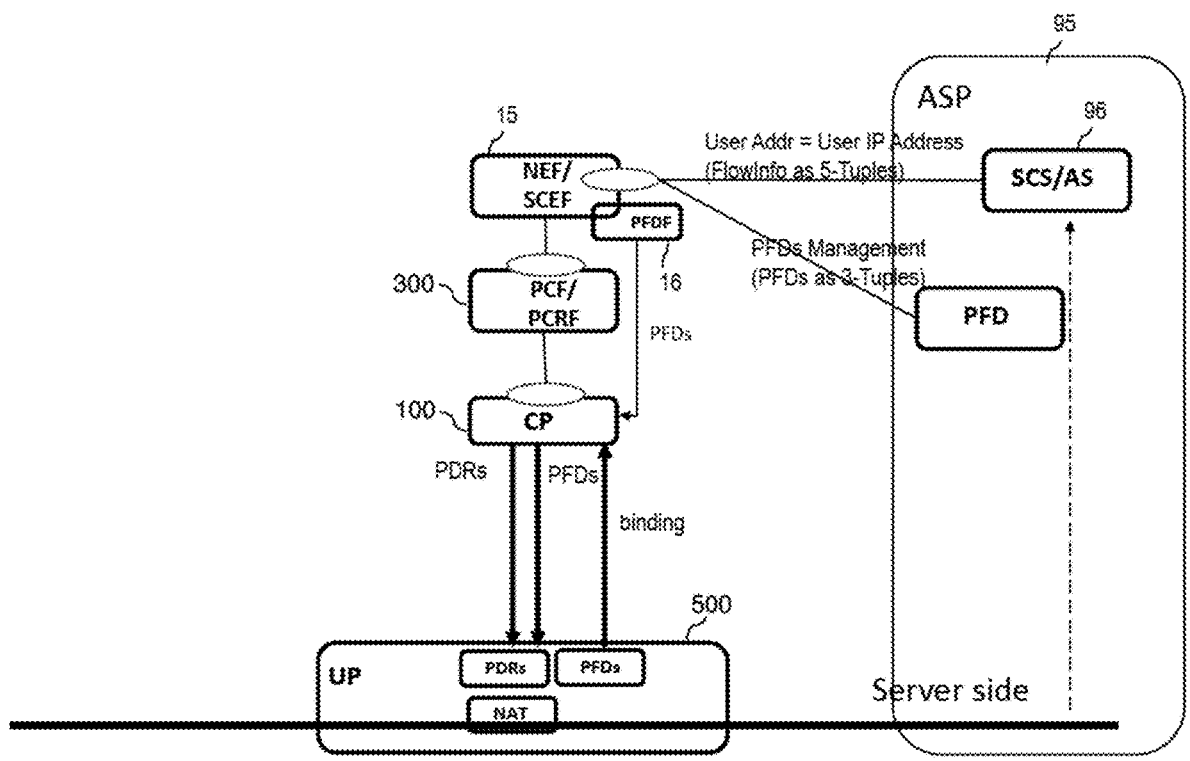
FIG. 4 shows a schematic architectural view of a system in which the components involved, such as user plane entity, session control entity and policy control entity, operate in order to cope with network address translations carried out in the user plane.
Figure 5:
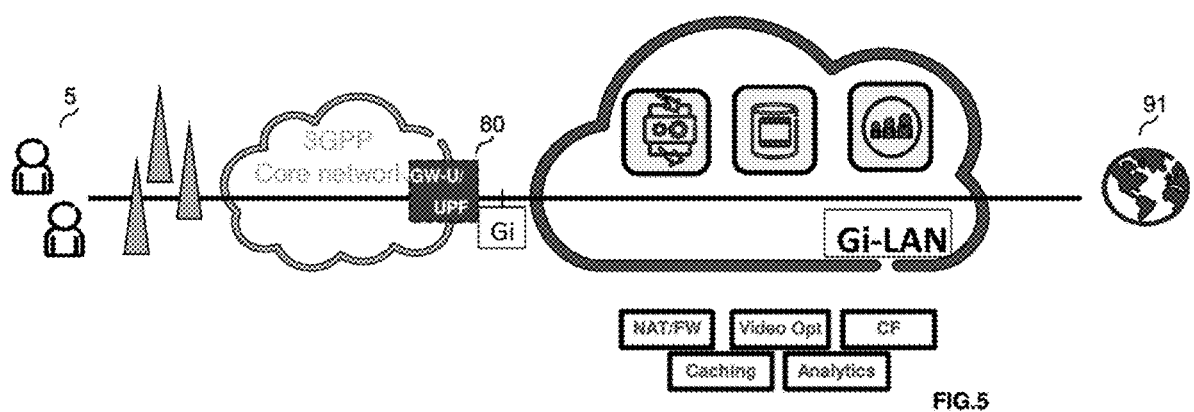
FIG. 5 shows a schematic architectural view of the user plane transmission between a user and the Internet as known in the art.

FIG. 4 shows an example schematic view of a system with the entities involved that can operate such that the different entities are informed about a network address translation performed in the user plane. A session control entity 100 is provided which can request policy rules from a policy control entity 300. The policy control entity 300 is in communication with the network exposure function 15. Furthermore, a packet flow description function 16 is provided which can provide packet flow descriptors to the session control entity 100. The packet flow descriptors and packet detection rules are transmitted to the user plane entity 500 where the received information is stored for an application on the user plane. On the server side the application service provider 95 is present with different application servers 96. The packet flow descriptors are exchanged via an interface at the NEF 15 and the user address of a data packet session to be handled by the application server is exchanged between the NEF 15 and the application server 96.

The session control entity 100 can install in the user plane entity 500 the reporting rule when a network address translation has been carried out in the user plane and the user plane can enforce this rule and inform the session control entity 100 of the occurring network address translation with the network address before and after translation.

The session control entity 100 stores the received binding information in the user PDU session upon reception of the usage report from the NAT event from the user plane entity 500. The PCF 300 can subscribe to receive the session binding information updates related to the network address translation. In this case, when a usage report is received from the user plane entity 500 in entity 100, entity 100 provides the binding information to the policy control entity 300.

The policy control entity 300 stores the binding information in the PCF user session when it is received. The policy control entity furthermore updates the session binding information in the Diameter Routing Agent, DRA, and Binding Support Function, BSF, if needed, by way of example in scenarios with more than one policy control entity.

The DRA and BSF can consider the session binding information when redirection or proxying the request from NEF 15 to the PCF handling the user session.

The policy control entity 300 also considers the binding information when it receives a request from the NEF 15. The request could be accepted also if the source IP address received in the request is in the received binding information of the PCF user session.

The session control entity 100 also considers the binding information upon receiving network addresses such as 5-tuples in policies from the policy control entity 300. Here the request could be accepted if the source IP address or port received in the dynamic policy are in the binding information of the user PDU session in the session control entity 100.

If the session control 100 accepts the PCF request, entity 100 can create the necessary packet detection rules and rules from the PCF policies. The session control entity can replace the source IP address/port received in the dynamic policy 5-tuple after the network address translation by the source IP and port before the network address translation according to the binding information, stored for this data packet session, e.g. in the user PDU session.

When the user plane entity generates the charging data records, CDRs, for flows that go through the network address translation, the CDR function can be placed after the address translation and the CDR can be configured to include both the source IP address and port before and after address translation.

Furthermore, when the session control entity 100 generates the CDRs, entity 100 can be configured to include both the source IP address and port of the flow before and after address translation taking as input the binding information stored for this data packet session, e.g. in the user PDU session.

When the CDRs are generated by the charging system, the session control entity 100 can provide the binding information in the reporting to the charging system if instructed to do so and the charging system can be configured to add this information to the user CDRs.

Figure 6:
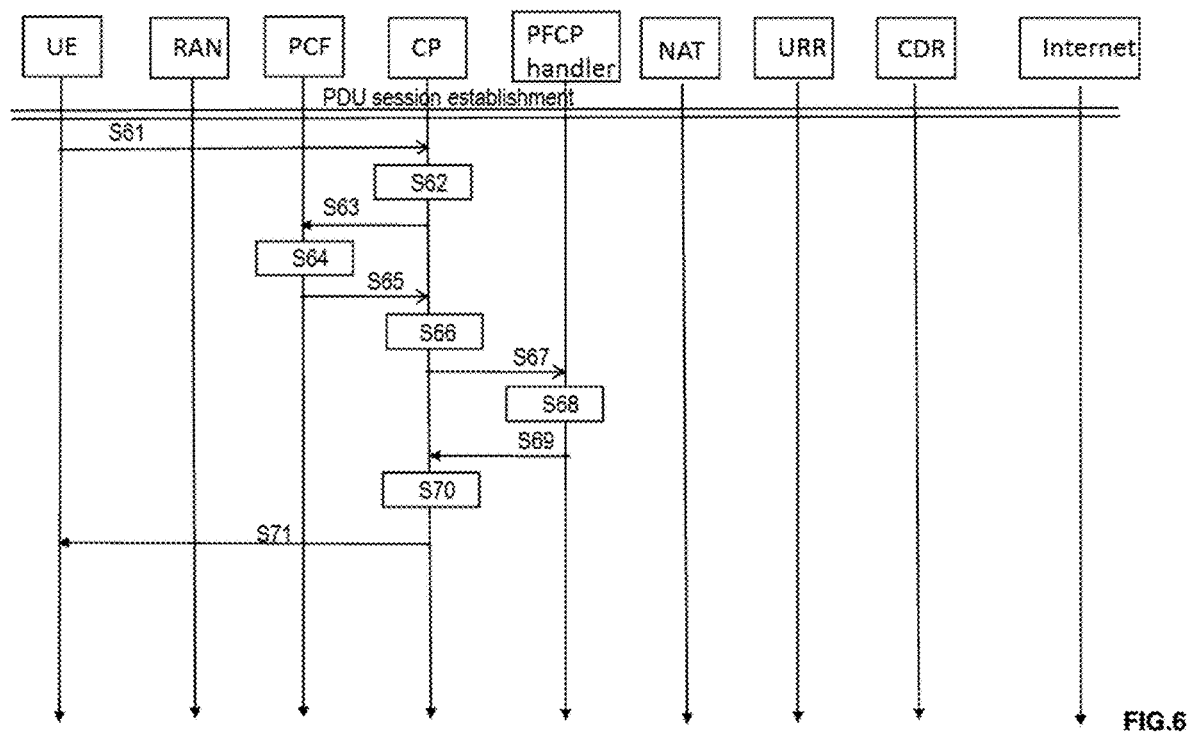
FIG. 6 shows an example schematic view of a message exchange between the involved entities in which the different components are notified that information about an address translation has to be provided.
Figure 7:
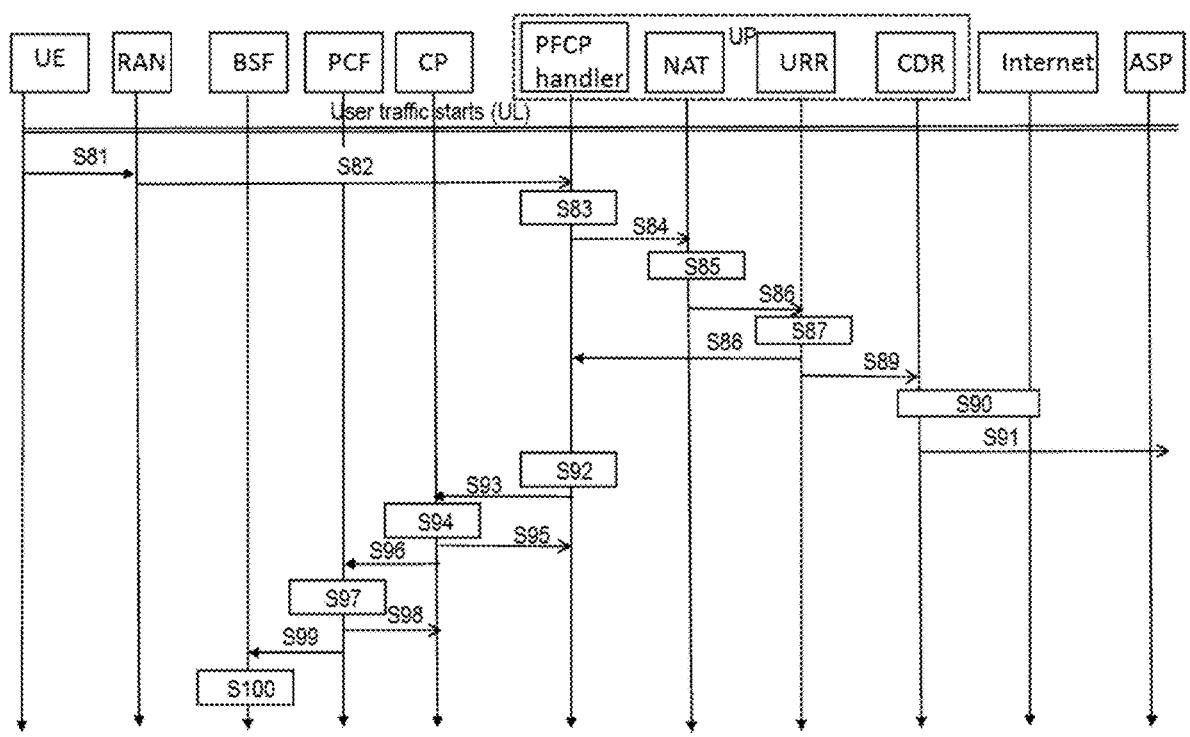
FIG. 7 shows an example schematic message exchange between the involved entities showing how the information about the network address translation is distributed to the different components involved.
Figure 8:
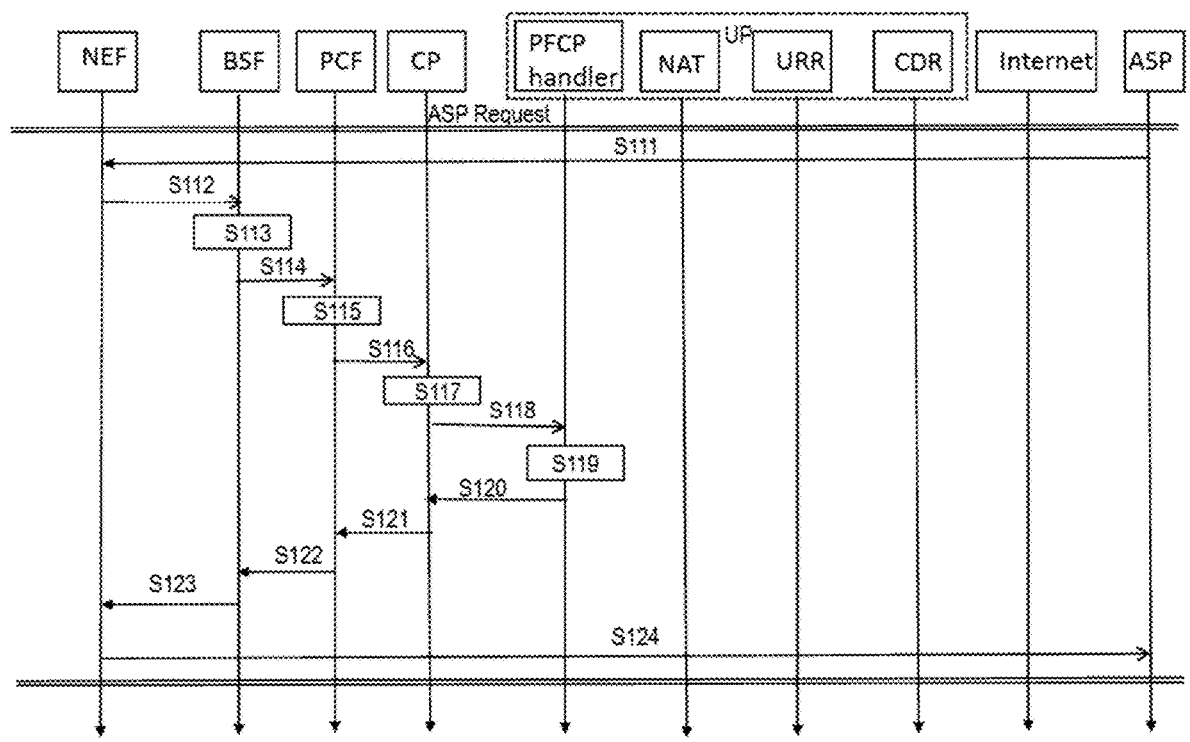
FIG. 8 shows an example schematic view of a message exchange between the involved entities illustrating how the different entities operate when a network address translation has been carried out in the user plane.

FIGS. 6 to 8 describe the impacts of the proposed solution on the processes. In these message exchanges the 5G message naming and entities were used. However, it should be understood that the same procedures could be used in a 4G or LTE deployment.

The discussion of FIGS. 6 to 8 describes the different aspects, wherein FIG. 6 mainly describes the subscription to the binding information of the different entities, FIG. 7 describes the distribution of the binding information and FIG. 8 describes how the different entities react when an actual network address translation has been carried out.

As will be explained in connection with FIG. 6, the session establishment procedure, here the PDU session establishment procedure, is intended to create a user PDU session on request by the UE. It is needed by the user prior to sending any data traffic. For the IP PDU session type, during this process, the UE gets at least one IP address. Furthermore, session contacts are created with the specifics for that session in the required network functions, such as the user plane entity 500, the policy control entity 300 and the session control entity 100.

The solution proposes to include a new event that should trigger the user plane entity 500 to report to the session control entity 100 when a flow has occurred for which a network address translation was carried out. The report from the user plane entity 500 to the session control entity 100 for this event needs to include the session binding information. Furthermore, a new trigger is proposed that the policy control entity 300 can use to subscribe to receive the binding information from the session control entity.

In step S61 the U1 transmits a session establishment request to the session control entity (PDU Session Establishment Request) and in step S62 the session is established (Session Establishment (TS 23.502)). In step S63 the session control entity transmits a request for the policies for the session to the policy control entity (SM Policy Association Establishment). In step S64 the policy control entity can authorize the request, can create the policy session and determine the session policies, the PCC rules and policy control request triggers including the request for information about a network address translation (Authorize the Request/ Create the Policy Session & determine Session Policies, PCC rules and Policy Control Request Triggers (NAT Event). Accordingly, the PCF can in step S64 authorize the request and can determine the policies that apply for the session, and can add the new policy control request trigger by which the session control entity is requested to provide session information updates related to a network address translation if the session control entity receives this binding information from the user plane entity. In step S65 the policy association establishment response is transmitted to the session control entity including the PDU session policies, the PCC rules and the triggers, especially the trigger for the event for the network address translation (SM Policy Association Establishment Response). Furthermore, the session control entity stores the information received from the policy control entity in S66 as part of the user PDU session and determines which packet detection rules and other rules need to be sent to the selected user plane entity. The URR can include the new network address translation event to request the session binding information (steps S66 and S67) (Determine the PDRs and Rules for UP (incl URR for NAT Event), N4 Session Establishment). In step S68 the corresponding part in the user plane entity, here the packet detection rule handler, creates the PFCP session and stores the PDRs, URRs, QERs and FARs (Create PFCP session and store PDRs, URR, QERs, FARs). Accordingly, the usage reporting rule with the new address translation event is stored so that it can be considered when payload is received. In step S69 the response is sent back to the session control entity (N4 Session Establishment Response) so that in step S70 the session can be established (Complete Session Establishment (TS 23.502)) and the PDU session establishment response is sent back in step S71 (PDU Session Establishment Response).

In connection with FIG. 7 it is disclosed how the PDU session modification procedure is intended to update the session contacts that have been created in different network functions during the PDU session establishment. This procedure can be triggered by OAM changes, IP traffic events, etc.

As will be discussed below, if the user plane entity has been instructed to provide the session binding information as discussed in connection with FIG. 6, the binding information is created in the user plane entity as the user traffic flow traverses the network address translation and that triggers the PDU session modification procedure. This procedure is extended to add distribution and storage of the binding information in the session contexts of the network functions that require so. This solution proposes extensions to the procedures for reporting from the user plane entity to the session control entity including the binding information comprising the user IP address/port before and after the address translation and for the report from the session control entity to the policy control entity comprising the binding information with the user IP address before and after the network address translation.

In step S81 the IP traffic is sent from the UE to the radio access network (IP Traffic) from where it is forwarded to the user plane entity in step S82 (IP Traffic).

In step S83 the user plane entity performs the PDR matching procedure and determines the rules that apply to the flow, the rules corresponding to the matched PDR (PDR Match/Determine rules and order of actions (UP internal service chain) URR for NAT event after NAT). From these rules the user plane entity derives the actions that the traffic needs to undergo including whether any service functions need to be chained and in which order the actions need to be taken. Here the traffic matches a PDR that includes the newly proposed URR for the network address translation event. Accordingly, this new URR will always be evaluated after the network address translation.

In step S84 the user data traffic (IP traffic) is sent to the network address translation as this was derived from the rules that apply to the flow. In steps S85 and S86 the traffic reaches the network address translation and the source IP address and the port of the flow are translated. The traffic is then forwarded back to the user plane that steers it to the next UP traffic function (IP & Port Translation) (IP Traffic). In step S87 and S88 the URR is evaluated (IP/Port Translation event trigger to Report) (Trigger to Report; Event: NAT, Info: NAT Session Binding). Comparing the source IP address and port of the packet with those it had when it entered the user plane, the NAT event is detected which triggers a report to the session control entity.

In steps S89 to S91 the user plane traffic is further steered, in this example to a function in charge of generating the CDRs before leaving the node (IP Traffic) (NAT Session Binding information in Data Records) (IP Traffic). The session binding information is included in the CDR to facilitate the tracking of the traffic and the records.

In step S92 the report is sent for the event that an IP and port translation with the session binding information is created (Report is sent for the Event: IP/Port translation with NAT Session Binding Information) and in step S93 the session report is transmitted to the session control entity including the event of the network address translation and the session binding with the address before and after translation (N4 Session Report; Event: NAT, NAT Session Binding). The session control entity stores the received session binding information in step S94 in the PDU session information (Session Binding info added to the session) and in step S95 the session acknowledgement is sent back (N4 Session Report ACK). In step S96 a policy association modification request is sent to the policy control entity including the trigger of the NAT event and the information of the session binding (SM Policy Association Modification; Trigger: (NAT Event), Info (NAT Session Binding)). Accordingly, the PDU session update in the session control entity triggers the modification procedure of the policy association towards the policy control entity as that requested using triggers at the PDU session establishment as discussed above in FIG. 6. The NAT session binding is provided to the policy control entity. This includes the source IP address before address translation and the source IP address of the address translation. The policy control entity stores the information in step S97 (NAT Session Binding Info added to the Policy Session) and in step S98 the policy association modification response is sent back to the session control entity (SM Policy Association Modification Response). Step S99 and S100 may be needed in scenarios with multiple policy control entities (BSF Management Register; IP address (after NAT) PCF Id) (User addresses after NAT-PCF Id registered). A BSF management register message is sent to the BSF including the IP address after network address translation and the ID of the policy control entity. In step S100 the user addresses after the address translation and the ID of the policy control entity are stored.

In a step not shown, after step S98 and before step S99, besides storing the binding information in relation to the data packet session the policy control entity can also transmit the second network address after the address translation to an entity intended to find the policy control entity in charge of the given network address when there is more than one policy control entity in the network. This entity is the BSF in the 5G network and the DRA in the 4G network.

FIG. 8 then shows the consuming of the session binding information. The external exposure of the network capabilities is intended, among others, to allow that the policy charging network capability that handles the QoS and charging for the user data flow can be exposed to an external party. In this way it can be enforced as requested by the external party and according to the service level agreements.

The solution discussed in FIG. 8 proposes to enhance this procedure so that the different network functions involved in the exposure process consider the new network address translation session binding information in their user session contexts. Since they are not aware of the source IP address and port translation, they can identify the user session whatever the user identifiers used before or after the address translation in the external party request, and can act accordingly.

The sequence shown in FIG. 8 would start at some point in time after the application service provider receives the user IP traffic as shown by step S91 in FIG. 7. In step S111 a request is received by the network exposure function from the ASP as follows (ASP Request; NEF_Chargeable Party OR Session with QoS Create; UE IP address, IP Flow 5-tuple (source IP port/port after NAT . . . ).

The source IP address and port after the address translation are the ones that have been used by the ASP to build the request. In step S112 the network exposure function sends the request via the BSF as specified for multiple PCF scenarios (Policy Authorization Create Charging/QoS for a Flow; UE IP Address, IP Flow 5-tuple). If only one PCF is available, the request is sent directly to the corresponding policy control entity. This request comprises the UE IP address and the IP flow 5-tuple after the translation. In step S113 the session binding information is used to find the corresponding policy control entity (Consider Session Binding to find the PCF/PCRF). In step S113 and 114 the BSF finds the policy control entity that handles the policy session for the user (Policy Authorization Create Charging/QoS for a Flow; UE IP Address, IP Flow 5-tuple). Thanks to the binding information that the BSF received previously from the policy control entity as discussed in FIG. 7, the BSF is able to relate the received user IP address after the address translation with the PCF ID and sends the NEF request to the correct PCF.

In steps S115 (Consider Session Binding in Request acceptance) and S116 (SM Policy Control Update Notify; Dynamic PCC) the PCF is able to identify the received policy session from the user IP address after the translation using the binding information that was received from the session control entity previously and it sends the request to the session control entity that holds the PDU session. It is a policy control update notification comprising dynamic PCC rules. In step S117 this session control entity identifies the user PDU session from the user IP address after the address translation thanks to the binding information that it received from the user plane entity previously (Consider Session Binding to identify the user and to create PDRs (IP/Port before NAT)). Accordingly, the session binding information is considered to identify the user and to create the PDRs for the IP and port before the network address translation. In step S118 a session modification request is sent to the user plane entity including the PDR, QER, URR and FAR (N4 Session Modification (PDR, QER, URR, FAR)). In this step S118 the PDRs and rules are sent to the user plane entity after replacing the source IP address and port received in the request with the source and IP address before the translation as stored in the binding information in the PDU session. The user plane stores these rules and takes them into account as part of the PDR matching and rule procedures for the user data traffic. Accordingly, in step S119 the PFCF session is updated with the new PDRs (PFCF Session Updated with new PDRs) and a session modification response is sent back in step S120 (N4 Session Modification Response). In step S121 the policy control update is acknowledged to the policy control entity (SM Policy Control Update ACK) and in step S122 it is the acknowledgement for step S114 (Policy Authorization Create Charging/QoS for a Flow ACK) and in step S123 an acknowledgement is sent back in response to step S112 (Policy Authorization Create Charging/QoS for a Flow ACK). In step S124 the response to step S111 is sent back to the ASP (NEF_Chargeable Party OR Session with QoS for a Flow Resp).

Figure 9:
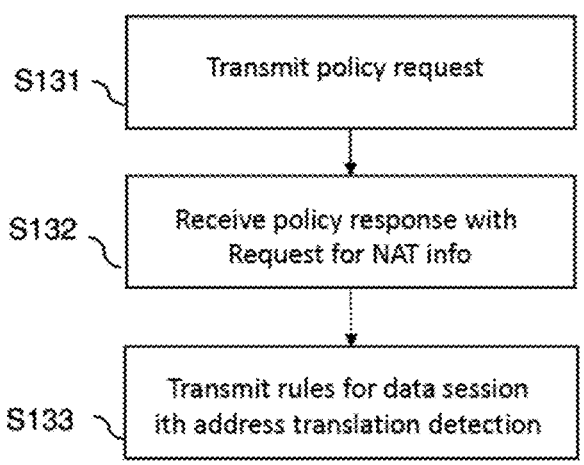
FIG. 9 shows an example flowchart of a method carried out in the session control entity in the flowcharts of FIGS. 6 to 8.
Figure 10:
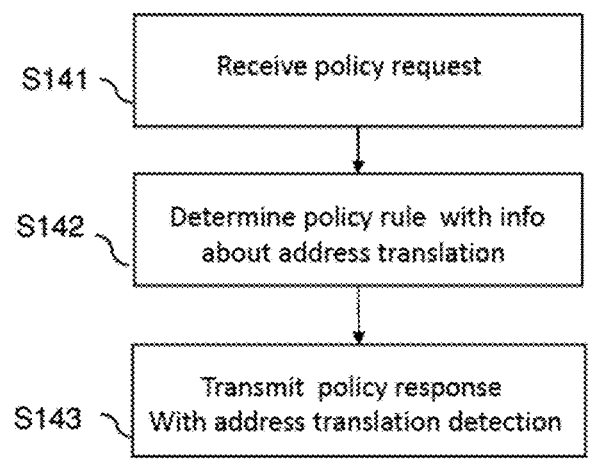
FIG. 10 shows an example flowchart of a method carried out in a policy control entity during a message exchange as discussed in connection with FIGS. 6 to 8.

FIG. 9 summarizes some of the steps carried out by the session control entity in the above discussed scenario. In step S131 the session control entity transmits a policy request to the policy control entity requesting the policy rule as discussed in FIG. 6, step S63. In step S132 the session control entity receives the policy response including the policy rule and including the request to provide information about an address translation as discussed above in step S65 of FIG. 6. In step S133 the policy rules are transmitted for the data packet session with the address translation detection, meaning the rule by which the user plane entity is requested to inform about an address translation that has been carried out. This was discussed in detail above in step S67 of FIG. 6.

As far as the policy control entity is concerned, it receives the corresponding request in step S141 from a session control entity which is the receiving part of step S131. In step S142 the policy control entity determines the policy rules with the information about the address translation as discussed in step S64 in FIG. 6. Furthermore, a policy response is transmitted to the session control entity which comprises the request to provide the information about the network address translation as discussed above in step S65 of FIG. 6.

Figure 11:
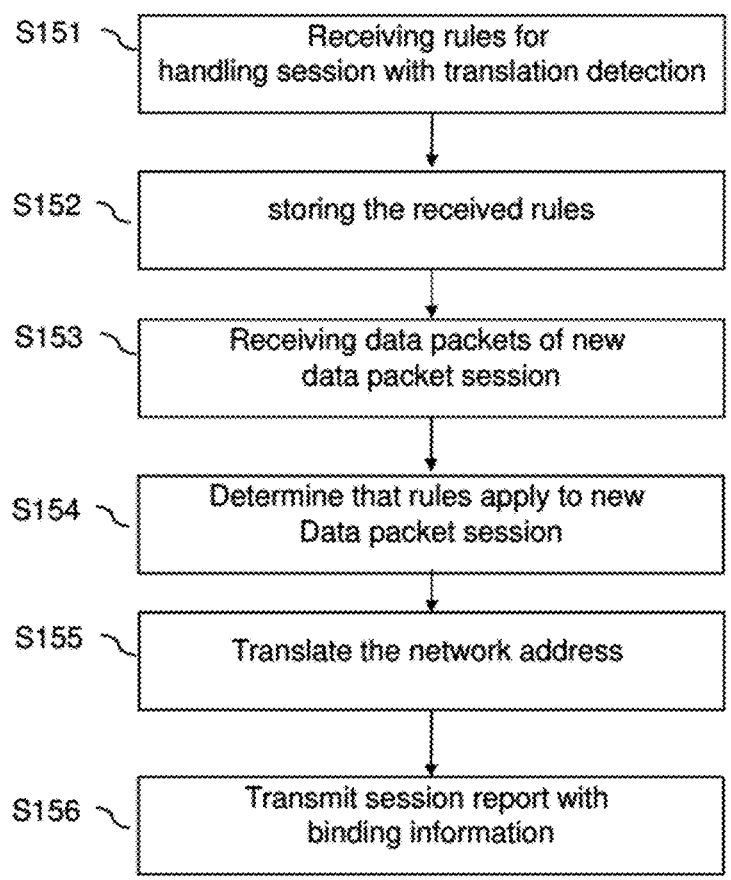
FIG. 11 shows an example flowchart of a method carried out in a user plane entity carrying out the network address translation in the data packets.

FIG. 11 summarizes some of the steps carried out at the user plane entity in the above discussed scenario. In step S151 the user plane entity receives the rules for handling the session with the translation detection as discussed above in step S67 of FIG. 6. The user plane entity stores in step S152 the rules with the translation detection rule as discussed in step S68. It then receives data packets of a new data packet session in step S153 and determines in step S154 that the rules apply to the new data packet session. Steps S153 and S154 correspond to steps S82 and S83 of FIG. 7. In step S155 the network address is actually translated from the first network address to the second network address as mentioned in step S87 of FIG. 7 and in step S156 a session report is transmitted to the session control entity including the binding information as discussed in step S93 of FIG. 7.

Figure 12:
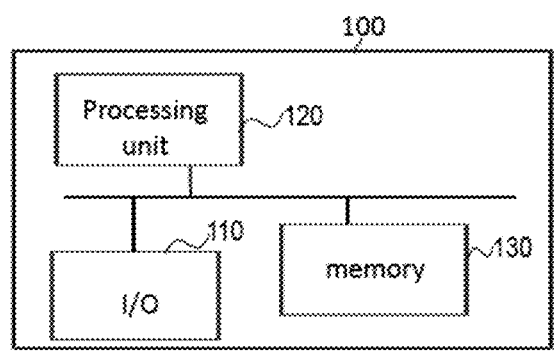
FIG. 12 shows an example schematic representation of a session control entity configured to operate as discussed in connection with FIGS. 6 to 8.

FIG. 12 shows a schematic architectural view of the session control entity 100 which can carry out the above discussed steps in which the session control entity 100 is involved. The session control entity 100 comprises an interface or input/output 110 configured to transmit user data or control messages to other entities and configured to receive user data or control messages from other entities. The interface 110 is especially configured to transmit the policy request and transmit the policy rules with the request for the binding information. The session control entity furthermore comprises a processing unit 120 which is responsible for the operation of the entity 100. The processing unit 120 can comprise one or more processors and can carry out instructions stored on a memory 130, wherein the memory may be a read-only memory, a random access memory, a mass storage, a hard disk or the like. The memory 130 can furthermore include suitable program code to be executed by the processing unit 120 so as to implement the above-described functionalities in which the session control entity is involved.

Figure 13:
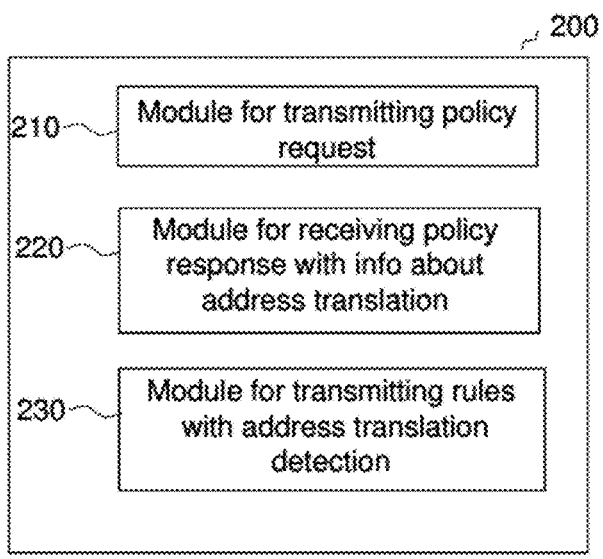
FIG. 13 shows another example schematic representation of the session control entity shown in FIG. 12.

FIG. 13 shows another schematic architectural view of the session control entity comprising a first module 210 configured to transmit the policy request, wherein a module 220 is configured to receive the policy response which comprises the request to provide the information about the address translation. Module 230 is configured to transmit the rules with the translation detection rule to the user plane entity.

Figure 14:
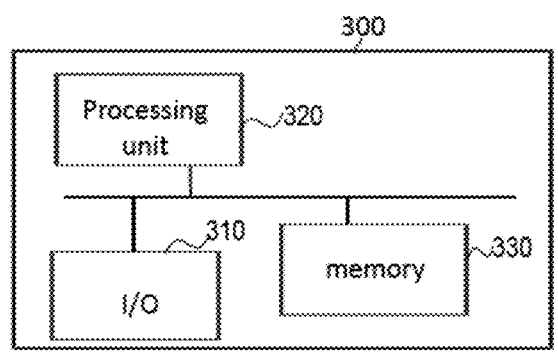
FIG. 14 shows an example schematic representation of a policy control entity configured to operate as discussed in connection with FIGS. 6 to 8.
Figure 15:
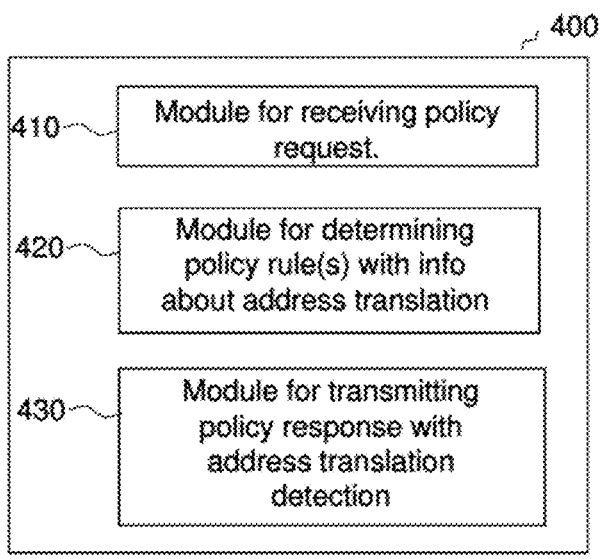
FIG. 15 shows another example schematic representation of a policy control entity shown in FIG. 14.

FIG. 14 shows a schematic architectural view of the policy control entity 300 which can carry out the above discussed steps in which the policy control entity is involved. The entity 300 comprises an interface or input/output 310 configured to transmit user data or control messages and configured to receive user data or control messages. The interface 310 can receive the policy request and can transmit the policy response with the rule for the provision of the binding information to the session control entity. The policy control entity furthermore comprises a processing unit 320 which is responsible for the operation of the entity 300. The processing unit 320 comprises one or more processors and can carry out instructions stored on a memory 330, wherein the memory may include a read-only memory, a random access memory, a mass storage, a hard disk or the like. The memory can furthermore include suitable program code to be executed by the processing unit 320 so as to implement the above-described functionalities in which the policy control entity is involved.

As an alternative the policy control entity 400 is provided comprising a first module configured to receive the policy request, e.g. the policy request from step S141. Furthermore, a second module 420 is provided configured to determine the policy rules including the request for the detection of the address translation and a module 430 is provided configured to transmit the policy response with the required network address translation detection to the session control entity.

Figure 16:
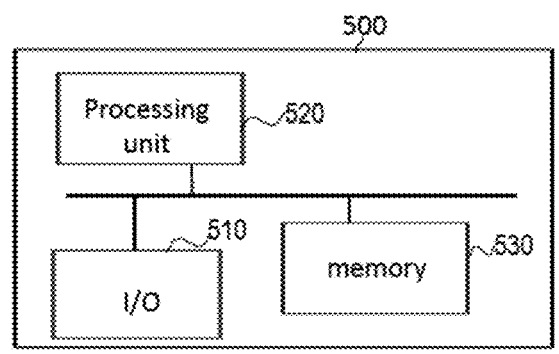
FIG. 16 shows an example schematic representation of a user plane entity handling the user plane and providing binding information with the network address before and after translation.

FIG. 16 discloses a schematic architectural view of a user plane entity 500 which can handle the user plane and can inform the different entities about the network address translation as required. The entity comprises the interface or input/output 510 which is provided for transmitting user data or control messages to other entities and which is configured to receive user data and control messages from other entities. The interface 510 receives the request to inform the session control entity of the occurring network address translation and the interface also forwards and receives the user data. The entity 500 furthermore comprises a processing unit 520 which is responsible for the operation of the entity 500. The processing unit 520 comprises one or more processors and can carry out instructions stored on a memory 530, wherein the memory may include a read-only memory, a random access memory, a mass storage, a hard disk or the like. The memory 530 can furthermore include suitable program code to be executed by the processing unit 520 so as to implement the above-described functionalities in which the user plane entity 500 is involved.

Figure 17:
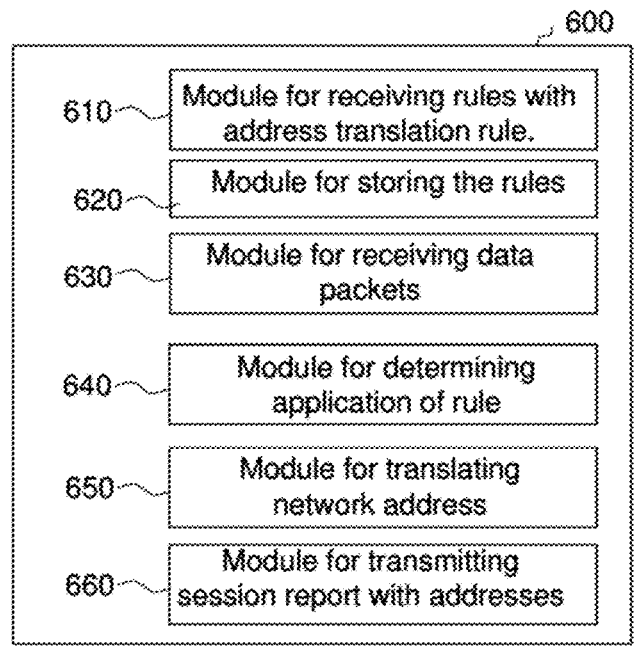
FIG. 17 shows another schematic representation of the user plane entity of FIG. 16.

FIG. 17 shows another schematic view of a user plane entity 600 comprising a first module configured to receive the rules including the address translation detection rule. A module 620 is configured to store the rules and a module 630 is provided configured to receive the data packets of the data packet session. Module 640 is provided for determining that the received rules apply to the data packet session and that the address translation has to be carried out. Module 650 is configured to translate the network address as required and module 660 is configured to transmit the session report with the session binding information to the session control entity.

From the above said some general conclusions can be drawn:

As far as the session control entity 100 is concerned, the session control entity can receive a session report from the user plane entity 500, wherein the session report comprises the information about the address translation that was carried out on the data packets of the data packet session. This was discussed above in connection with step S93 and FIG. 7. Furthermore, it stores the information about the address translation in the user session data provided for the data packet session as discussed in step S94 and transmits a modification request to the policy control entity 300 including the address translation as discussed in step S96 above.

The received session report can comprise the binding information with the first network address of the data packets before the address translation and the second network address different from the first network address after the address translation. The transmitted modification request can furthermore comprise the binding information.

Furthermore, the request to provide information about the address translation may be implemented as an event rule by which the user plane entity 500 is triggered to report the event to the session control entity 300 when an address translation has been detected or carried out at the user plane entity.

The session control entity 100 can furthermore receive a further request for a further data packet session from the policy control entity, e.g. step S116 of FIG. 8. It can determine that the further request relates to the data packet session based on the fact that the network address present in the further data packet session corresponds to the second network address after the address translation. This was discussed in step S117 in FIG. 8. This further request is then stored in relation to the data packet session as also discussed in step S117.

Here the rules for handling the further data packet session are determined based on the rules for the data packet session, and the second network address after the address translation is replaced by the first network address based on the binding information, and the rules are transmitted to the user plane entity with the first network address as network address as discussed in step S118 in FIG. 8.

Furthermore, the session control entity 100 may generate charging data used for charging the user for the data packet session. The charging data can comprise the first network address and the second network address.

As far as the policy control entity 300 is concerned, the policy control entity 300 can furthermore receive a modification request from the session control entity 100 which includes the binding information with the first network address and the second network address before and after address translation. The policy control entity 300 then stores the binding information in relation to the data packet session as discussed in step S96 in FIG. 7.

The policy control entity can receive a further request relating to a further data packet session, can identify that the further request relates to the data packet session based on the binding information, can determine the session control entity responsible for the data packet session and can transmit the request to the determined session control entity. This was discussed above in steps S114 to S116 in FIG. 8.

The policy control entity can also transmit the second network address after the address translation to an entity intended to find the policy control entity in charge of the given network address when there are more than one policy control entities in the network.

As far as the user plane entity is concerned, the user plane entity may furthermore generate charging data used for charging the user for the data packet session, wherein the charging data comprise the first network address and the second network address. Furthermore, the address translation may relate to the translation of a source network address describing the origin of the data packet session.

The solution discussed above leverages the general trend to bring the Gi-LAN functionality into the user plane. The Gi-LAN functions become service functions of a user plane internal service chain. The network address translation is one of these internal service functions. When the network address translation is within the user plane entity, it is possible for the user plane entity to perform the user plane actions after the address translation, but before the flow is definitely leaving the user plane entity. The solution proposes that the session control entity 100 can request to the user plane to report when NAT is enforced on a certain flow. The session control entity 100 requests this reporting using specific URR rules that the user plane can evaluate after the network address translation in the internal service chain of the affected flow. At the event of an IP address/port translation the user plane entity 500 can detect that the flow source IP address and port have changed and can report to the session control entity 100 the event with the flow source IP address and port before and after the address translation. This has been called session binding information.

Furthermore, it is proposed that the session control entity stores this session binding information and distributes it further to the network functions involved in the procedure for exposure of the network capabilities to external parties, namely the policy control entity 300 and the DRA or BSF in the case of a multi-PCF scenario. The entities extend their session information with it and take it into account in upcoming procedures.

The proposed solution allows to have a session binding information in extensions to the CDRs which facilitates the post-processing and the dialogue with the application service providers as needed. The CDRs could be generated by the user plane entity, the session control entity and/or by the charging system.

Furthermore, it allows to solve the CSP-ASP well-known collaboration issues of network address translation scenarios. The ASP request can include now an IP flow description according to the flow characteristics that the ASP sees, namely the source IP address and port after the address translation. The address translation session binding information distributed from the user plane to the session control entity and then to other network functions allows the mobile core nodes to solve the source IP address/port mismatch and handle the ASP request.

Accordingly, the problem of source IP and port mismatch in collaborative scenarios is solved when there is a network address translation between the mobile core and the ASP, especially for the cases when the ASP cannot receive the original source IP address before network address translation and port from the application signaling.

The invention claimed is:

1. A method for operating a session control entity configured to control a data packet session of a user in a cellular network, the method comprising:
   transmitting a policy request to a policy control entity of the cellular network, requesting at least one policy rule for the data packet session;
   receiving a policy response from the policy control entity including the at least one policy rule for the data packet session, the policy response further comprising a request to provide information about an address translation carried out in a user plane on the data packets of the data packet session; and
   transmitting rules for handling the data packet session to a user plane entity configured to handle the user plane of the data packet session, the rules comprising a translation detection rule by which the user plane entity is requested to inform the session control entity about the address translation that has taken place in the user plane.

2. The method according to claim 1, further comprising:
receiving a session report from the user plane entity, the session report comprising the information about the address translation that was carried out on the data packets of the data packet session;
storing the information about the address translation in user session data provided for the data packet session; and
transmitting a modification request to the policy control entity including the address translation.

3. The method according to claim 2, wherein the received session report comprises binding information with a first network address of the data packets before the address translation and a second network address different from the first network address after the address translation, wherein the transmitted modification request comprises the binding information.

4. The method according to claim 3, further comprising:
receiving a further request for a further data packet session from the policy control entity;
determining that the further request relates to the data packet session based on the fact that the network address present in the further data packet session corresponds to the second network address after the address translation; and
storing the further request in relation to the data packet session.

5. The method according to claim 4, further comprising:
determining the rules for handling the further data packet session based on the rules for the data packet session;
replacing the second network address after the address translation by the first network address based on the binding information; and
transmitting the rules to the user plane entity with the first network address as network address.

6. A method for operating a policy control entity configured to control policy rules for a data packet session of a user in a cellular network, the method comprising:
receiving a policy request from a session control entity requesting at least one policy rule for the data packet session;
determining the at least one policy rule for the data packet session, the determining comprising determining that the policy control entity be informed about an address translation carried out in a user plane on the data packets of the data packet session; and
transmitting a policy response to the session control entity, the policy response comprising the at least one policy rule which comprises a request to provide information about the address translation carried out in the user plane on the data packets of the data packet session.

7. The method according to claim 6, further comprising:
receiving a modification request from the session control entity including binding information with a first network address of the data packets before the address translation and a second network address after the address translation; and
storing the binding information in relation to the data packet session.

8. The method according to claim 7, further comprising:
receiving a further request relating to a further data packet session;
identifying, based on the binding information, that the further request relates to the data packet session;
determining the session control entity responsible for the data packet session; and
transmitting the request to the determined session control entity.

9. The method according to claim 7, further comprising:
transmitting the second network address to an entity configured to identify a policy control entity in charge of a given network address when there is more than one policy control entity in the cellular network.

10. A method for operating a user plane entity configured to handle a user plane of a data packet session of a user in a cellular network, the method comprising:
receiving rules for handling the data packet session from a session control entity, the rules comprising a translation detection rule by which the user plane entity is requested to inform the session control entity about the address translation that has taken place in the user plane;
storing the received rules with the translation detection rule;
receiving data packets of a new data packet session;
determining that the received rules apply to the new data packet session, and that an address translation has to be carried out in the data packets of the new data packet session;
translating at least one network address in the data packets of the new data packet session in which a first network address of the data packets is replaced by a second network address of the data packets different from the first network address; and
transmitting a session report to the session control entity, the session report comprising binding information with the first network address of the data packets before the address translation and the second network address different from the first network address after the address translation.

11. A session control entity configured to control a data packet session of a user in a cellular network, the session control entity comprising a memory and at least one processing unit, the memory containing instructions executable by the at least one processing unit to configure the session control entity to:
transmit a policy request to a policy control entity of the cellular network, requesting at least one policy rule for the data packet session;
receive a policy response from the policy control entity including the at least one policy rule for the data packet session, the policy response further comprising a request to provide information about an address translation carried out in a user plane on the data packets of the data packet session; and
transmit rules for handling the data packet session to a user plane entity configured to handle the user plane of the data packet session, the rules comprising a translation detection rule by which the user plane entity is requested to inform the session control entity about the address translation that has taken place in the user plane.

12. The session control entity according to claim 11, further configured to:
receive a session report from the user plane entity, the session report comprising the information about the address translation that was carried out on the data packets of the data packet session;

store the information about the address translation in user session data provided for the data packet session; and
transmit a modification request to the policy control entity including the address translation.

13. The session control entity according to claim 12, wherein the received session report comprises binding information with a first network address of the data packets before the address translation and a second network address different from the first network address after the address translation, wherein the transmitted modification request comprises the binding information.

14. The session control entity according to claim 12, further configured to:
receive a further request for a further data packet session from the policy control entity;
determine that the further request relates to the data packet session based on that the network address present in the further data packet session corresponds to the second network address after the address translation; and
store the further request in relation to the data packet session.

15. The session control entity according to claim 14, further configured to:
determine the rules for handling the further data packet session based on the rules for the data packet session;
replace the second network address after the address translation by the first network address based on the binding information; and
transmit the rules to the user plane entity with the first network address as network address.

16. A policy control entity configured to control policy rules for a data packet session of a user in a cellular network, the policy control entity comprising a memory and at least one processing unit, the memory containing instructions executable by the at least one processing unit to configure the policy control entity to:
receive a policy request from a session control entity requesting at least one policy rule for the data packet session;
determine the at least one policy rule for the data packet session, the determining comprising determining that the policy control entity be informed about an address translation carried out in a user plane on the data packets of the data packet session; and
transmit a policy response to the session control entity, the policy response comprising the at least one policy rule which comprises a request to provide information about the address translation carried out in the user plane on the data packets of the data packet session.

17. The policy control entity according to claim 16, further configured to:

receive a modification request from the session control entity including binding information with a first network address of the data packets before the address translation and a second network address after the address translation; and
store the binding information in relation to the data packet session.

18. The policy control entity according to claim 17, further configured to:
receive a further request relating to a further data packet session;
identify, based on the binding information, that the further request relates to the data packet session;
determine the session control entity responsible for the data packet session; and
transmit the request to the determined session control entity.

19. A user plane entity configured to handle a user plane of a data packet session of a user in a cellular network, the user plane entity comprising a memory and at least one processing unit, the memory containing instructions executable by the at least one processing unit to configured the user control entity to:
receive rules for handling the data packet session from a session control entity, the rules comprising a translation detection rule by which the user plane entity is requested to inform the session control entity about the address translation that has taken place in the user plane;
store the received rules with the translation detection rule;
receive data packets of a new data packet session;
determine that the received rules apply to the new data packet session, and that an address translation has to be carried out in the data packets of the new data packet session;
translate at least one network address in the data packets of the new data packet session in which a first network address of the data packets is replaced by a second network address of the data packets different from the first network address; and
transmit a session report to the session control entity, the session report comprising binding information with the first network address of the data packets before the address translation and the second network address different from the first network address after the address translation.

20. The user plane entity according to claim 19, further configured to generate charging data used for charging the user for the data packet session, wherein the charging data comprise the first network address and the second network address.

* * * * *